(12) United States Patent
Wheeler et al.

(10) Patent No.: US 7,911,811 B2
(45) Date of Patent: Mar. 22, 2011

(54) SWITCHING POWER SUPPLY WITH INCREASED EFFICIENCY AT LIGHT LOAD

(75) Inventors: William R. Wheeler, Tamshui Chen (TW); Wei-Liang Lin, Tamshui Chen (TW)

(73) Assignee: Acbel Polytech Inc., Taiwan (CN)

( * ) Notice: Subject to any disclaimer, the term of this patent is extended or adjusted under 35 U.S.C. 154(b) by 333 days.

(21) Appl. No.: 12/246,620

(22) Filed: Oct. 7, 2008

(65) Prior Publication Data

US 2009/0290387 A1 Nov. 26, 2009

(30) Foreign Application Priority Data

May 20, 2008 (TW) ................................ 97118463 A

(51) Int. Cl.
*H02M 3/335* (2006.01)
(52) U.S. Cl. .......................... 363/21.01; 363/71; 363/95
(58) Field of Classification Search ............... 363/21.01, 363/21.1, 21.18, 66, 67, 71, 95, 97, 131
See application file for complete search history.

(56) References Cited

U.S. PATENT DOCUMENTS

| | | | | |
|---|---|---|---|---|
| 6,714,425 B2* | 3/2004 | Yamada et al. | ............. | 363/21.12 |
| 6,839,247 B1* | 1/2005 | Yang et al. | ................. | 363/21.11 |
| 2008/0062725 A1* | 3/2008 | Yang | ............................ | 363/21.1 |
| 2008/0232141 A1* | 9/2008 | Artusi et al. | ............... | 363/21.01 |

* cited by examiner

*Primary Examiner* — Adolf Berhane
(74) *Attorney, Agent, or Firm* — Christopher P. Maiorana, PC

(57) ABSTRACT

A switching power supply with the increased efficiency at light load has a switching power circuit, a power monitoring circuit and a light load power supplying circuit. The switching power circuit converts an AC power to a stable DC power and sends the DC power to a load according to voltage variation of the load. When the power monitoring circuit detects the AC power and determines that the load is in a light state, the power monitoring circuit controls the light load power supplying circuit to output a small-power DC to the load. As the DC power provided by the light load power supplying circuit is small, the switching loss ratio is lower in its light load state. Therefore, the operating efficiency at the light load state is higher.

16 Claims, 6 Drawing Sheets

SWITCHING POWER SUPPLY WITH INCREASED EFFICIENCY AT LIGHT LOAD

This application claims the benefit of Taiwan Application No. 097118463, filed May 20, 2008.

BACKGROUND OF THE INVENTION

1. Field of the Invention

The invention relates to a switching power supply and, in particular, to a switching power supply having increased power conversion efficiency at light load.

2. Description of Related Art

Since the line voltage is AC power while the operating power for computer devices is DC power, a power supply for converting the AC power to DC power is required for most computers.

With reference to FIG. 6, a conventional power supply includes an AC to DC converting unit 81 and a DC to DC converter 82. The AC to DC converter 81 electrically connects to the line voltage to obtain the AC power and converts the AC power into a DC power. The DC to DC converter 82 electrically connects to the AC to DC converter to receive the outputted DC power and further converts the received DC power into a DC power for supplying to a load 90.

Currently, a commonly seen AC to DC converting unit 81 includes a rectifier and a boost power factor correction (PFC) circuit. In addition to converting the AC power into DC power in phase with the AC power, the AC to DC converting unit 81 also boosts the voltage level of the DC power. For example, the DC power is boosted to 380 V. The DC to DC converter 82 uses a voltage bucking circuit correspondingly so as to reduce the DC power to a desired voltage level being usable by the load 90. The DC to DC converter 82 can be a flyback converter, a forward converter, or a push-pull converter. The overall power converting efficiency of the DC converter 82 is determined by on and off operations of a power transistor in the DC converter 82.

Since the voltage imposed on the source and drain of the power transistor is equal to the DC power voltage output from the AC to DC converting unit 81, the imposed voltage on and the current flowing through the source and drain result in switching loss when the power transistor is switched on and off. If the load 90 is a medium or heavy load, the overall power to the load 90 is relatively large. In other words, the proportion of the switching loss to the output power is relatively small. The power converting efficiency is acceptable.

However, if the load 90 is a light load, the proportion of the switching loss and other consumption for maintaining basic circuit operations to the output power is obviously higher because the output power is small. As a result, the overall operating efficiency of the power supply drops down. Therefore, it is necessary to find a solution for this problem.

SUMMARY OF THE INVENTION

To increase the overall operating efficiency of the power supply, an objective of the invention is to provide a switching power supply that can enhance power conversion efficiency at light load by providing a light load power supplying circuit for the light load.

To achieve the above-mentioned objective, the switching power supply comprises a switching power circuit, a power monitoring circuit and a light load power supplying circuit.

The switching power circuit includes a rectifying unit, a power factor correction (PFC) unit and a first DC to DC converter. The rectifying unit rectifies the AC power. The PFC unit connects to the rectifying unit to perform power factor corrections and output high-voltage DC power. The first DC to DC converter connects to the PFC unit to buck the DC power voltage output from the PFC unit and outputting the bucked DC power to a load.

The power monitoring circuit connects to the AC power and the first DC to DC converter and checks the AC power to determine whether the load is in a heavy, medium, or light state. When the load is in a heavy or medium state, the first DC to DC converter is controlled to operate, dropping the DC power output by the PFC unit and outputting it to the load. Otherwise, the first DC to DC converter stops outputting DC power to the load.

The light load power supplying circuit includes a charging circuit, a battery, and a second DC to DC converter. The charging circuit connects to the PFC unit and the power monitoring circuit. When the power monitoring circuit determines that the load is in a heavy or medium state, the charging circuit is controlled by the power monitoring circuit to operate. The DC power of the PFC unit is converted into a charge power. When the power monitoring circuit determines that the load is in a light state, the charging circuit is controlled by the power monitoring circuit to stop operating. The battery connects to the charging circuit for charging. The second DC to DC converter connects to the power monitoring circuit, the battery, and the load. When the power monitoring circuit determines that the load is in a light state, the second DC to DC converter is controlled by the power monitoring circuit to operate, providing the DC power output by the battery to the load.

According to the above-mentioned technique, the voltage of the battery of the light load power supplying circuit is smaller. Therefore, when the load is in a light state, the switching loss of the second DC to DC converter of the light load power supplying circuit is relatively lower than the power output to the load. This thus increases the operating efficiency of the switching power supply at light load.

DETAILED DESCRIPTION OF THE PREFERRED EMBODIMENT

Figure 1:
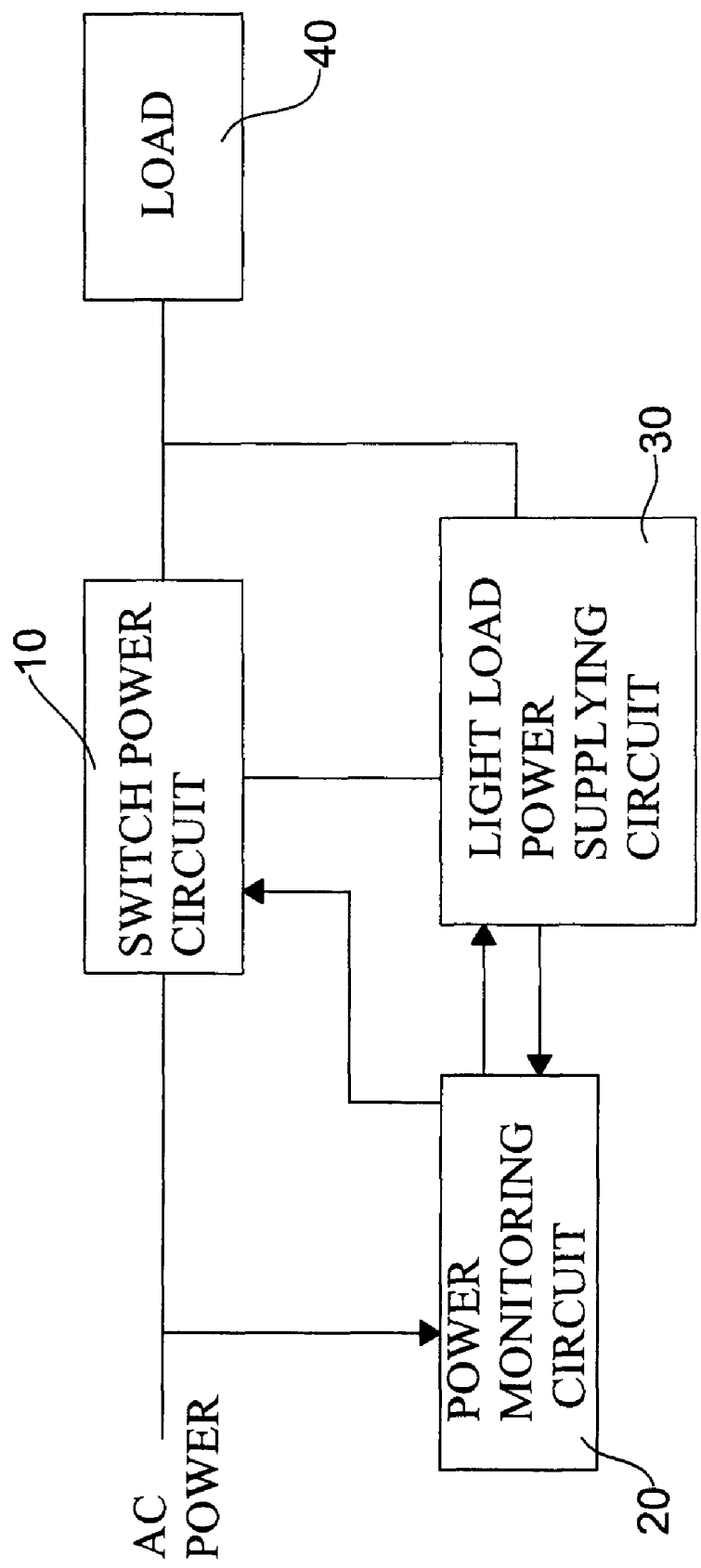
FIG. 1 is a functional block diagram of a switching power supply in accordance with the present invention.

With reference to FIG. 1, a switching power circuit 10 is operated with a power monitoring circuit 20 and a light load power supplying circuit 30.

Figure 2:
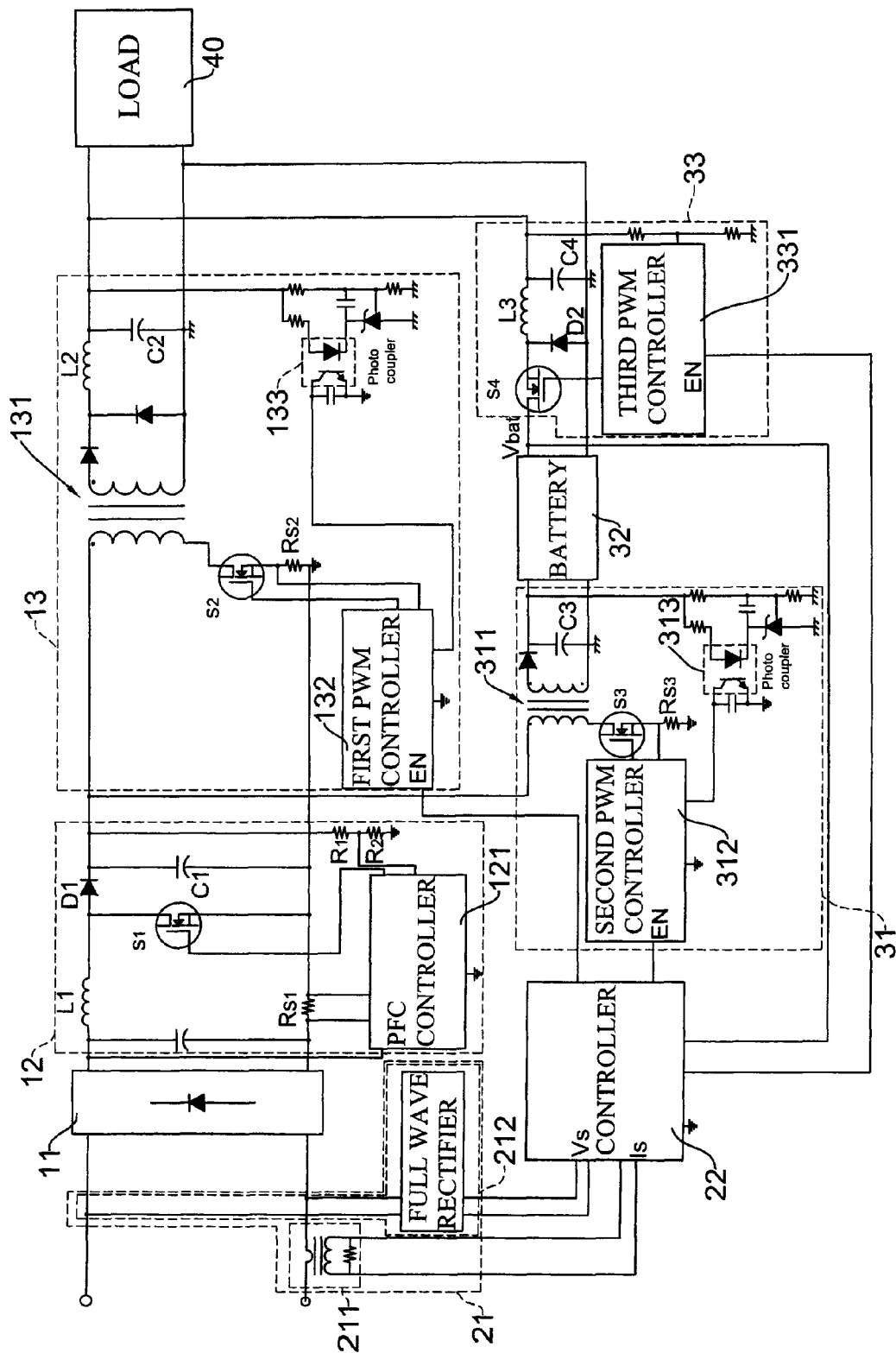
FIG. 2 is a circuit diagram of a preferred embodiment in accordance with the present invention.

With reference to FIG. 2, the switching power circuit 10 comprises a rectifying unit 11, a power factor correction (PFC) unit 12 and a first DC to DC converter 13.

The rectifying unit 11 connects to an AC power (e.g., line voltage) and rectifies the AC power. In this embodiment, the rectifying unit 11 is a full-wave rectifier.

The PFC unit 12 connects to the rectifying unit 11 to perform power factor corrections and output high-voltage DC power. In this embodiment, the PFC unit 12 comprises an inductor L1, a diode D1, a filter capacitor C1, a first active switch S1 and a PFC controller 121. The PFC unit 12 uses the PFC controller 121 to control the conduction time of the first active switch S1, thereby changing the voltage level of the DC power output by the PFC unit 12. The PFC controller 121 connects to the filter capacitor C1 via a voltage divider R1/R2 and to a first current sensing resistor RS1 connected with the full-wave rectifier 11 in order to detect the voltage and current of the power circuit. The DC power output from the rectifying unit 11 is thus power factor corrected based on the detected results.

The first DC to DC converter 13 electrically connects to the PFC unit 12 to buck the DC power voltage output from the PFC unit 12 and output the bucked DC power to a load 40. The first DC to DC converter 13 can be a flyback converter, a forward converter or a push-pull converter. In this embodiment, the first DC to DC converter 13 is a forward converter. The forward converter includes a transformer 131 with a primary side and a secondary side, a second active switch S2, a first pulse width modulation (PWM) controller 132 and a filter capacitor C2. The second active switch S2 electrically connects to the primary side of the transformer 131. The first PWM controller 132 electrically connects and controls the second active switch S2. The filter capacitor C2 electrically connects to the secondary side of the transformer 131. Moreover, the first PWM controller 132 further electrically connects to the filter capacitor C2 through a photo coupler 133, thus obtaining the voltage level variation of the load 40. The first PWM controller 132 then adjusts the conduction time of the second active switch S2 according to the voltage level variation on the load 40. Therefore, the voltage level of DC power supplied to the load 40 can be stabilized.

The power monitoring circuit 20 connects to the AC power and the first DC to DC converter 13. The power monitoring circuit 20 detects the AC power to determine whether the load 40 is a heavy, medium or light load. When the load 40 is detected to be heavy or medium, the power monitoring circuit 20 activates the first DC to DC converter 13 to output the bucked DC power to the load 40. In this embodiment, the power monitoring circuit 20 includes an AC detecting circuit 21 and a controller 22.

The AC detecting circuit 21 connects between the AC power and the rectifying unit 11 to sense the magnitude of the AC power. In this embodiment, the AC detecting circuit 21 has a current sampling unit 211 and a voltage sampling unit 212. The current sampling unit 211 can be a series of resistors or a current transformer that senses a current signal of the AC power. The voltage sampling unit 212 includes two wires across the AC power and a full wave rectifier to sense a voltage level signal of the input AC power.

The controller 22 connects to the first PWM controller 132 and the AC detecting circuit 21 to sense the state of the load 40. When the load 40 is in a heavy or medium state, the controller 22 outputs an enable signal to the first PWM controller 132 for outputting DC power to the load 40.

The light load power supplying circuit 30 includes a charging circuit 31, a battery 32 and a second DC to DC converter 33.

The charging circuit 31 connects to the PFC unit 12 and the controller 22 of the power monitoring circuit 20. When the power monitoring circuit 20 determines that the load 40 is in a heavy or medium state, the charging circuit 31 is operated based on the control of the power monitoring circuit 20 to convert the DC power of the PFC unit 12 into charge power. When the power monitoring circuit 20 determines that the load 40 is at the light state, the charging circuit 31 stops functioning under the control of the power monitoring circuit 20.

The charging circuit 31 can be a flyback converter, a forward converter or a push-pull converter. The charging circuit 31 is a flyback converter in the embodiment and comprises a transformer 311 with a primary side and a secondary side, a third active switch S3, a second PWM controller 312 and a filter capacitor C3. The primary side of the transformer 311 connects to the filter capacitor C1 of the PFC unit 12. The third active switch S3 connects to the primary side of the transformer 311. The second PWM controller 312 connects to the controller 22 of the power monitoring circuit 20 and the third active switch S3. When the controller 22 determines that the load 40 is in a heavy or medium state, it drives the second PWM controller 312 to make the third active switch S3 switching (ON/OFF). The DC power of the PFC unit 12 is converted into charge power. The filter capacitor C3 connects to the secondary side of the transformer 311.

The battery 32 connects to the controller 22 of the power monitoring circuit 20 and the filtering capacitor C3 of the charging circuit 31 to be charged by the charge power from the charging circuit 31. The controller 22 detects a voltage level Vbat of the battery 32. Moreover, analogous to the forward converter, the flyback converter senses the voltage level variation of the battery 32 via a photo coupler 313. Consequently, the second PWM controller 312 can adjust the conduction time of the third active switch S3 to provide a stable DC voltage level to the battery 32 according to the voltage level variation of the battery 32.

The second DC to DC converter 33 connects to the controller 22 of the power monitoring circuit 20, the battery 32 and the load 40. When the controller 22 determines that the load 40 is in a light state, the second DC to DC converter 33 is controlled to make the battery 22 output the DC power to the load 40. In this embodiment, the second DC to DC converter 33 is a buck converter having a fourth active switch S4, an inductor L3, a diode D2, a filter capacitor C4, and a third PWM controller 331. The third PWM controller 331 connects to the controller 22 of the power monitoring circuit 20. When the controller 22 determines that the load 40 is in a light state, the third PWM controller 331 is driven to make the fourth active switch S4 conductive for outputting the DC power from the battery 32 to the load 40. As the battery 32 has a lower voltage, the voltage across the fourth active switch S4 is lower than that across the second active switch S2. As a result, the switching loss of the fourth active switch S4 is lower than S2, increasing the output efficiency.

The controller 22 further stores a light load threshold, a power storage threshold, a converting procedure for irregular power, a power supply controlling procedure and a power storage checking procedure.

Figure 3:
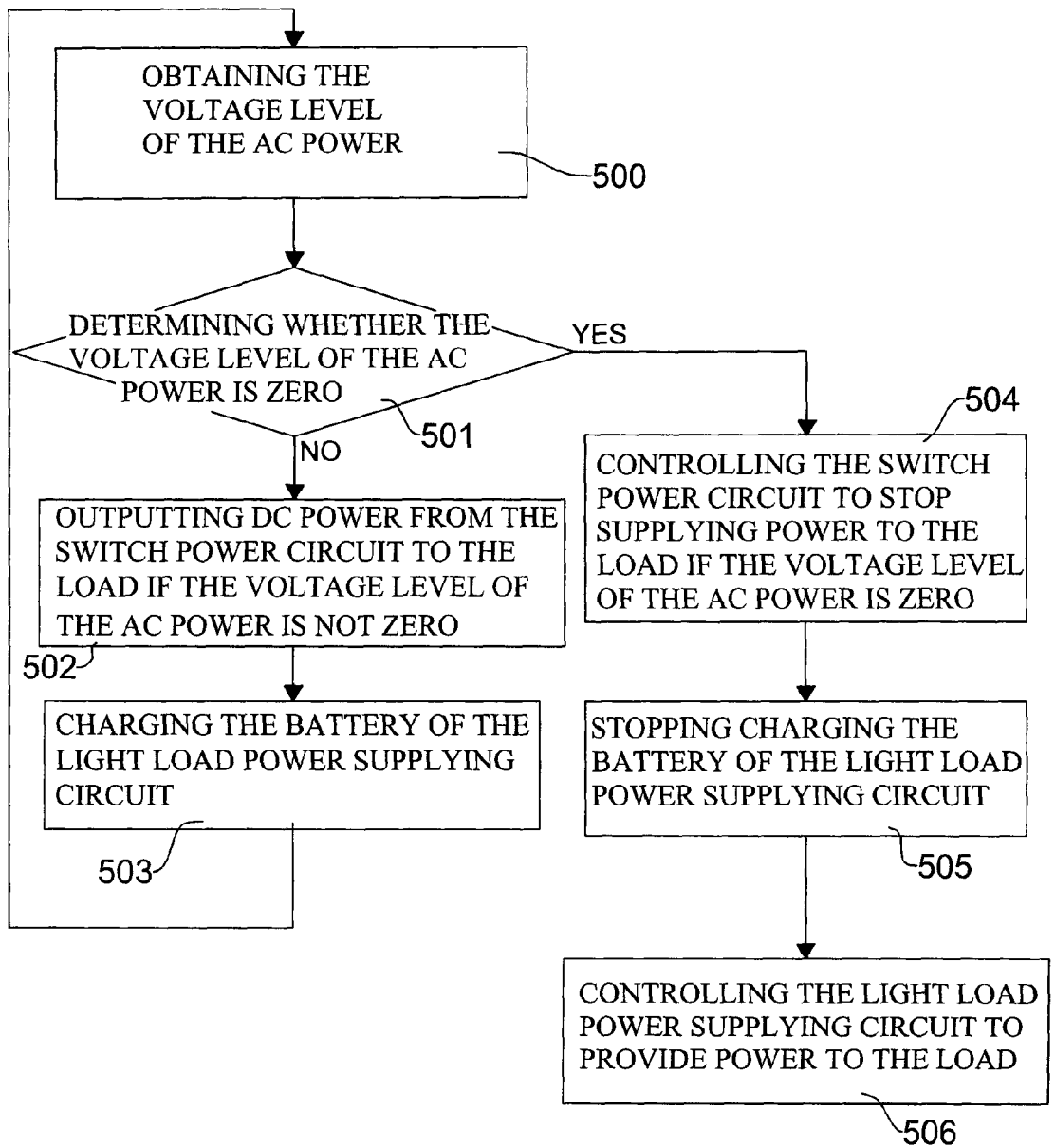
FIG. 3 is a flow chart of the converting procedure for irregular power in accordance with the present invention.

With reference to FIG. 3, the converting procedure for irregular power includes the steps of obtaining the voltage level of the AC power (500), determining whether the voltage level of the AC power is zero (501), outputting DC power from the switching power circuit to the load if the voltage level of the AC power is not zero (502), charging the battery of the light load power supplying circuit (503), controlling the switching power circuit to stop supplying power to the load if the voltage level of the AC power is zero (504), stopping charging the battery of the light load power supplying circuit (505), and controlling the light load power supplying circuit to provide power to the load (506).

In the step of outputting DC power from the switching power circuit to the load if the voltage level of the AC power is not zero (502), an enable signal is continuously sent to the first PWM controller 132 of the first DC to DC converter 13 to output the DC power to the load 40.

In the step of continuously charging the battery of the light load power supplying circuit (503), an enable signal is continuously sent to the second PWM controller 312 in the charging circuit 31 of the light load power supplying circuit 30 so that the charging circuit 31 continuously operates to charge the battery 32 thereof. The procedure then returns to the act obtaining the voltage level of the AC power (500).

In the step of controlling the switching power circuit to stop supplying power to the load if the voltage level of the AC power is zero (504), no enable signal is sent to the first PWM controller 132 of the first DC to DC converter 13.

In the step of stopping charging the battery of the light load power supplying circuit (505), no enable signal is sent to the second PWM controller 312 in the charging circuit 31 of the light load power supplying circuit 30 so that the charging circuit 31 stops charging the battery 32.

In the step of controlling the light load power supplying circuit to provide power to the load (506), an enable is sent to the third PWM controller 331 of the second DC to DC converter 33 so that the third PWM controller 331 turns the fourth active switch S4 to switch (ON/OFF), providing power from the battery 32 to the load 40.

Figure 4:
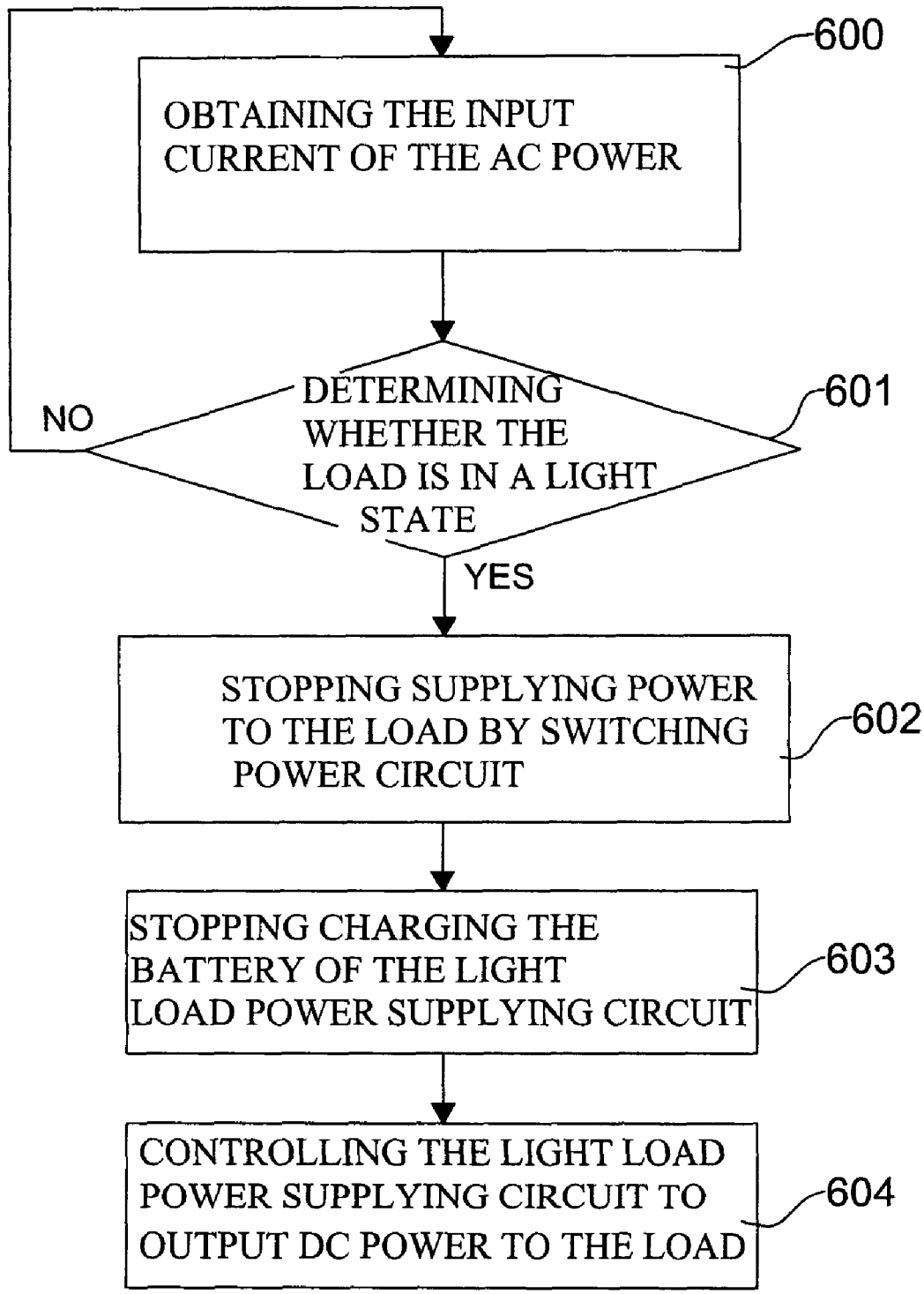
FIG. 4 is a flow chart of the power supply controlling procedure in accordance with the present invention.

With reference to FIG. 4, the power supply controlling procedure includes the steps of obtaining the input current of the AC power (600), determining whether the load is in a light state (601), stopping supplying power to the load (602), stopping charging the battery of the light load power supplying circuit (603) and controlling the light load power supplying circuit to output DC power to the load (604).

In the step of obtaining the input current of the AC power (600), the current sampling unit 211 of the AC detecting circuit 21 extracts the input current signal of the AC power.

In the step of determining whether the load is in a light state (601), the input current signal of the AC power and the light load threshold are compared. The load 40 is determined to be in a heavy or medium state if the input current signal of the AC power is no less than the light load threshold and the step of obtaining the input current of the AC power (600) is executed again. Otherwise, the following steps are executed.

In the step of stopping supplying power to the load (602), no enable signal is sent to the first PWM controller 132 in the first DC to DC converter 13 of the switching power circuit 10, stopping supplying power to the load 40.

In the step of stopping charging the battery of the light load power supplying circuit (603), no enable signal is sent to the second PWM controller 312 in the charging circuit 31 of the light load power supplying circuit 30.

In the step of controlling the light load power supplying circuit to output DC power to the load (604), an enable signal is sent to the third PWM controller 331 in the second DC to DC converter 33 of the light load power supplying circuit 30. The second DC to DC converter 33 starts to output the DC power of the battery 32 to the load 40.

Figure 5:
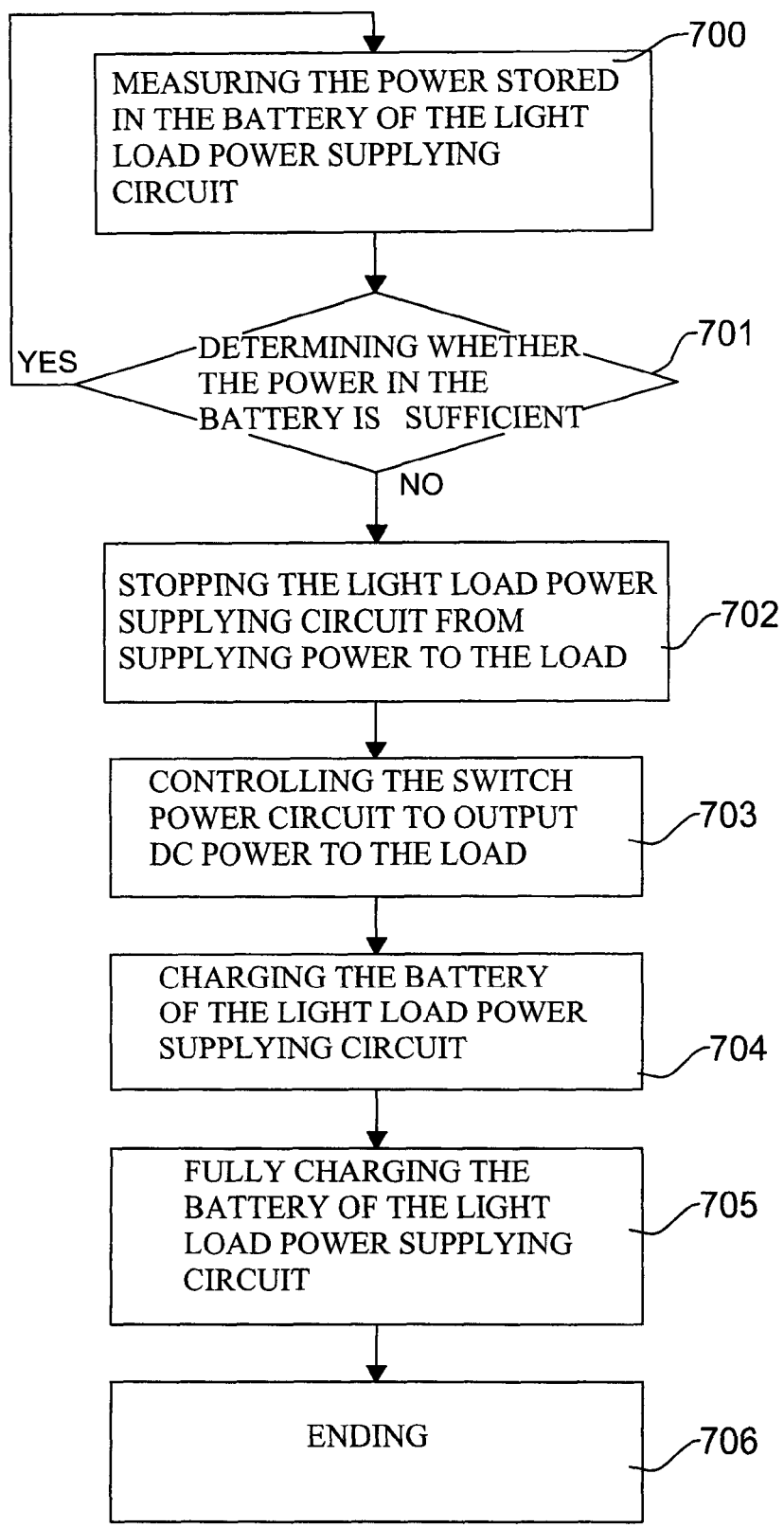
FIG. 5 is a flow chart of the power storage checking procedure in accordance with the present invention.
Figure 6:
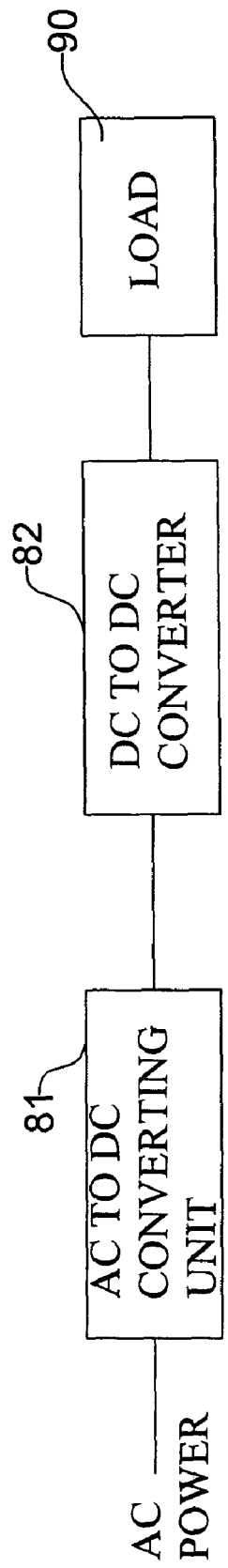
FIG. 6 is a functional block diagram of a conventional power supply.

With reference to FIG. 5, the power storage checking procedure includes the steps of measuring the power stored in the battery of the light load power supplying circuit (700), determining whether the power in the battery is sufficient (701), stopping the light load power supplying circuit from supplying power to the load (702), controlling the switching power circuit to output DC power to the load (703), charging the battery of the light load power supplying circuit (704), fully charging the battery of the light load power supplying circuit (705) and ending (706).

In the step of determining whether the power storage of the light load power supplying circuit is sufficient (701), the voltage level Vbat of the battery 32 and the power storage threshold are compared. If the voltage level of the battery 32 is no less than the power storage threshold, then the electricity power of the battery 32 is still sufficient. In this case, the step of obtaining the power storage amount of the light load power supplying circuit (700) is executed again. Otherwise, the following steps are executed.

In the step of stopping the light load power supplying circuit from supplying power to the load (702), no enable signal is sent to the third PWM controller 331 of the second DC to DC converter 33. The third PWM controller 331 stops the conduction of the fourth active switch S4. Therefore, the battery 32 no longer supplies power to the load 40.

In the step of controlling the switching power circuit to output DC power to the load (703), an enable signal is sent to the first PWM controller 132 of the first DC to DC converter 13 for outputting the DC power to the load 40.

In the step of charging the battery of the light load power supplying circuit (704), an enable is sent to the second PWM controller 312 in the charging circuit 31 of the light load power supplying circuit 30. The charging circuit 31 functions to fully charge the battery 32 of the light load power supplying circuit 30 (705).

According to the above description, when the load 40 is in a heavy or medium state, the AC power provides the required power to the load 40. Therefore, the AC power is processed by the switching power circuit 10 and output to the load 40. The switching power circuit 10 also charges the battery 32 of the light load power supplying circuit 30 so that it is kept fully charged. When the load 40 is in a light state, the power monitoring circuit 20 can detect the light load and stop the switching power circuit 10 from outputting DC power to the load 40. Instead, the battery 32 of the light load power supplying circuit 30 provides DC power to the load 40. That is, the DC power supplied to the light load power supplying circuit 30 comes from the battery 32. The voltage across the fourth active switch S4 is smaller than that across the second active switch S2. Therefore, the switching loss ratio produced by the load 40 at light load is lower. This thus increases the operating efficiency in the light load state.

Besides, when the source of AC power is abnormal, e.g., power failure, the invention can switch to the light load power supplying circuit 30 to provide DC power to the load 40 for emergency supply. If the power storage in the battery 32 of the light load power supplying circuit 30 is insufficient, the invention switches to the switching power circuit 10 to supply power to the load 40.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A switching power supply with increased efficiency at light load comprising:
   a switching power circuit comprising
      a rectifying unit to rectify input AC power;
      a power factor correction (PFC) unit connected to the rectifying unit for power factor corrections and outputting DC power with a high voltage level; and
      a first DC to DC converter connected to the PFC unit for bucking the DC power output from the PFC unit and outputting the bucked DC power to a load;

a power monitoring circuit connected to the AC power and the first DC to DC converter to detect power of the AC power, determining whether the load is in a heavy, medium or light state, controlling the first DC to DC converter to operate when the load is in a heavy or medium state and bucking the DC power output from the PFC unit and outputting the bucked DC power to the load, or stopping the first DC to DC converter from outputting DC power to the load when the load is in a light state; and a light load power supplying circuit comprising
   a charging circuit connected to the PFC unit and the power monitoring circuit, controlled by the power monitoring circuit to convert the DC power output from the power factor correction unit to charge power when the load is in a heavy or medium state, and to stop operating when the load is in a light state;
   a battery connected to the charging circuit and charged by the charging circuit; and
   a second DC to DC converter connected to the power monitoring circuit, the battery and the load, and controlled by the power monitoring circuit to provide the DC power output from the battery to the load when the load is in a light state.

2. The switching power supply as claimed in claim 1, wherein the charging circuit comprises
   a transformer,
   a third active switch,
   a second pulse width modulation (PWM) controller connected to the power monitoring circuit, and receiving an enable signal from the power monitoring circuit to make the charging circuit start to charge the battery; and
   a filter capacitor.

3. The switching power supply as claimed in claim 2, wherein the second PWM controller connects to the filter capacitor of the charging circuit via a photo coupler to sense voltage level variation of the battery for controlling conduction time of the third active switch to provide a stable DC power to the battery.

4. The switching power supply as claimed in claim 2, wherein the charging circuit is a flyback converter, forward converter or push-pull converter.

5. The switching power supply as claimed in claim 1, wherein the second DC to DC converter is a buck converter and comprises:
   a fourth active switch;
   an inductor;
   a diode;
   a filter capacitor; and
   a third PWM controller connected to the power monitoring circuit and turning the fourth active switch on when the power monitoring circuit sends an enable signal to the third PWM controller so that the battery provides DC power to the load.

6. A switching power supply as claimed in claim 1, wherein the power monitoring circuit comprises:
   an AC detecting circuit connected between the AC power and the rectifying unit; and
   a controller connected to the first DC to DC converter, the charging circuit of the light load power supplying circuit, the battery, the second DC to DC converter and the AC detecting circuit;
   wherein the controller detects the load state through the AC detecting circuit, and stores a power supply controlling procedure to control the first DC to DC converter to output DC power to the load when the load is in a heavy or medium state or alternatively stops the first DC to DC converter from outputting DC power to the load when it is in a light state, uses the battery to supply power to the load and stops charging the battery.

7. The switching power supply as claimed in claim 6, wherein the controller stores a light load threshold and the power supply controlling procedure comprises the steps of:
   obtaining an input current signal of the AC power using the AC detecting circuit;
   determining whether the load is in a light state by comparing the input current signal of the AC power with the light load threshold, where the load is in a heavy or medium state if the input current signal is no less than the light load threshold and the step of obtaining the input current signal of the AC power is repeated or the following steps are followed otherwise;
   stopping the first DC to DC converter from supplying power to the load;
   controlling the charging circuit of the light load power supplying circuit to stop charging the battery; and
   controlling the second DC to DC converter of the light load power supplying circuit to output DC power of the battery to the load.

8. The switching power supply as claimed in claim 7, wherein the controller stores a power storage threshold and a power storage checking procedure comprising the steps of:
   measuring the power stored in the battery of the light load power supplying circuit;
   determining whether the power stored in the battery is sufficient by comparing a voltage level of the battery with the power storage threshold, where the battery power is sufficient if its voltage level is no less than the power storage threshold and the step of measuring the power stored in the battery of the light load power supplying circuit is repeated or the following steps are followed otherwise;
   stopping the second DC to DC converter from providing DC power of the battery to the load;
   controlling the first DC to DC converter to output DC power to the load; and
   controlling the charging circuit of the light load power supplying circuit to charge the battery until its power storage is full.

9. The switching power supply as claimed in claim 7, wherein the controller stores a converting procedure for irregular power, comprising the steps of:
   obtaining the voltage level of the AC power;
   determining whether the voltage level of the AC power is zero;
   continuing DC power output from the switching power circuit to the load if the voltage level of the AC power is not zero by controlling the first DC to DC converter to keep supplying DC power to the load;
   stopping the switching power circuit from supplying DC power to the load if the voltage level of the AC power is zero;
   stopping the charging circuit of the light load power supplying circuit from charging the battery; and
   controlling the second DC to DC converter to supply DC power of the battery to the load.

10. The switching power supply as claimed in claim 8, wherein the controller stores a converting procedure for irregular power, comprising the steps of:
   obtaining the voltage level of the AC power;
   determining whether the voltage level of the AC power is zero;
   continuing DC power output from the switching power circuit to the load if the voltage level of the AC power is not zero by controlling the first DC to DC converter to keep supplying DC power to the load;

controlling the charging circuit of the light load power supplying circuit to continue charging the battery of the light load power supplying circuit and repeating the step of obtaining the voltage level of the AC power;

stopping the switching power circuit from supplying DC power to the load if the voltage level of the AC power is zero;

stopping the charging circuit of the light load power supplying circuit from charging the battery; and controlling the second DC to DC converter to supply DC power of the battery to the load.

11. The switching power supply as claimed in claim 9, wherein the AC detecting circuit further comprises a current sampling unit to sense the input current signal of the AC power and a voltage sampling unit to sense the voltage level signal of the input AC power.

12. The switching power supply as claimed in claim 10, wherein the AC detecting circuit further comprises a current sampling unit to sense the input current signal of the input AC power and a voltage sampling unit to sense the voltage level signal of the input AC power.

13. The switching power supply as claimed in claim 11, wherein the current sampling unit is a series of resistors or a current transformer.

14. The switching power supply as claimed in claim 12, wherein the current sampling unit is a series of resistors or a current transformer.

15. The switching power supply as claimed in claim 1, wherein the PFC unit comprises an inductor, a diode, a filter capacitor, a first active switch, and a PFC controller.

16. The switching power supply as claimed in claim 1, wherein the first DC to DC converter is a flyback converter, forward converter, or push-pull converter.

* * * * *